(No Model.)
H. C. SWAN.
SPRING SHACKLE FOR VEHICLES.
No. 597,225.  Patented Jan. 11, 1898.
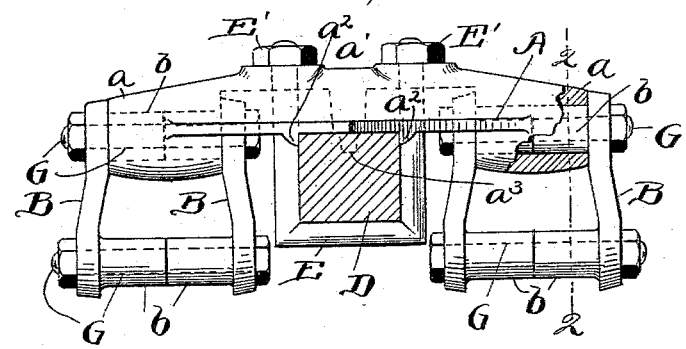
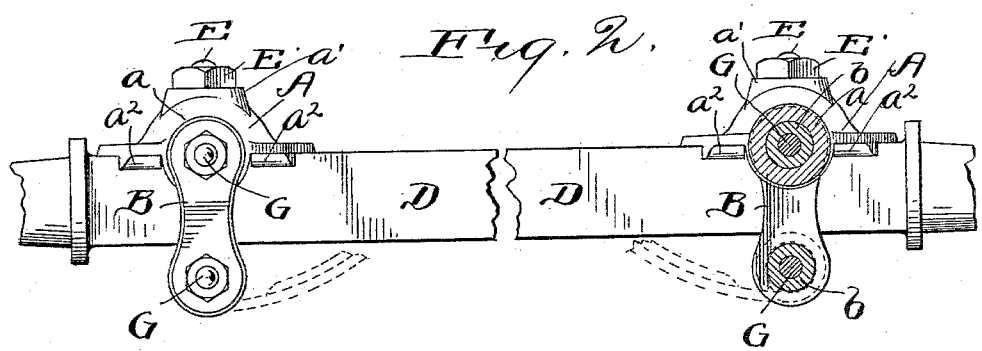
Witnesses
E. B. Gilchrist
Helen M. Hutchison
Inventor
Henry C. Swan
By E. L. Thurston
his atty

UNITED STATES PATENT OFFICE.

HENRY C. SWAN, OF OSHKOSH, WISCONSIN.

SPRING-SHACKLE FOR VEHICLES.

SPECIFICATION forming part of Letters Patent No. 597,225, dated January 11, 1898.

Application filed July 6, 1896. Serial No. 598,145. (No model.)

*To all whom it may concern:*

Be it known that I, HENRY C. SWAN, a citizen of the United States, and a resident of Oshkosh, Winnebago county, State of Wisconsin, have invented new and useful Improvements in Spring-Shackles for Vehicles, of which the following is a specification.

The style of vehicle to which my improved shackle may be applied is known to the trade as "duplex half-elliptic spring wagons."

In shackles for connecting duplex half-elliptic springs with the axles as heretofore constructed the shackle-plate has been provided with arms which extend laterally therefrom and rest upon the axles, to which said arms are there secured by clips. In this construction it is necessary that the shackle be removed inward from the collar of the axle a distance equal to the length of these arms, and this necessarily compels the use of shorter springs, thereby lessening the easy-riding qualities of the wagon due to the use of springs.

The object of my invention is to produce spring-shackles for connecting duplex half-elliptic springs to an axle which are neat in appearance, simple and cheap in construction, which can be employed for the described purpose with the maximum length of springs adapted for use between the wheels, and which can be secured to the axle by one clip instead of two.

It is believed that the device hereinafter described, embodying the invention which is pointed out in the claim, is cheaper and better than any of the prior devices of a similar character, and obviously it can be secured to the axle in about half the time necessary to secure a device with two clips. Moreover, the use of one clip which engages with the middle part of shackle-plate, between the two forwardly and rearwardly projecting ends which support the links, makes a firmer and more rigid connection than can be made with two clips which engage with laterally-projecting arms.

In the drawings, Figure 1 is a sectional side view of an axle and my improved shackle secured thereto. Fig. 2 is a front view of both ends of said axle and the shackles secured thereto, the right-hand shackle being sectioned in the plane indicated by line 2 2 of Fig. 1.

Referring to the parts by letters, D represents the axle; A, the shackle-plate; B, the shackle-links, and E the clip by means of which the shackle-plate is secured upon the axle.

It will be seen by reference to Fig. 1 that the shackle-plate A sits astride the axle, and its ends $a$ extend, respectively, to the front and rear thereof. Both of these ends are horizontally perforated to receive the shackle-links B. In this particular case the shackle-links are formed with barrels $b$, which enter the perforated ends $a$ of the shackle-plate A. The bolt G, passing through both barrels, secures same in position, whereby the bolt is relieved of any strain excepting to hold the shackles in position. As this forms no part of my invention, it is unnecessary to explain further in regard to the shackle-links.

The body $a'$ of the shackle-plate A may be of concavo-convex form, as indicated by the dotted lines of Fig. 1, or it may be solid; but the former construction is preferred. The body is formed with flanges $a^2 a^2$, which extend down in contact with the sides of the axles, as shown in Fig. 1. This prevents the shackle-plate from being twisted or assuming a diagonal position in relation to the axle. It is also formed with a pin $a^3$, Fig. 1, which is received in a hole in the axle, whereby the shackle is prevented from sliding upon the axle. The shackle-plate is held in position upon the axle by the single centrally-placed clip E and nuts E' E'.

It will be seen that the body of the shackle is vertically perforated in line with the front and rear sides of the axle, as shown by dotted lines, Fig. 1, to allow the threaded ends $e$ of the clip E to pass through and receive the nuts which bear upon the top of said shackle-plate. This construction permits the shackle-plate to be securely fastened to the axle by a single clip instead of two clips, which have heretofore been necessarily employed.

Having described my invention, I claim—

In a spring-shackle, the shackle-plate A provided with two vertical openings through its center, and having perforated ends, and the flanges $a^2$ upon its lower side to catch upon opposite sides of the axle; and the pin $a^3$ at its center to catch in the top of the axle to prevent the shackle from sliding thereon, and the clip $e$ by means of which the shackle-plate is secured to the axle; combined with the shackle-links which are provided upon their inner sides with the barrels through which the bolts pass, and which links have their upper ends applied to opposite ends of the perforated portion of the shackle-plate, and the bolts which are made to pass through the shackle-plate, the barrels upon their inner sides and the perforated ends of the shackle-plate, substantially as set forth.

In testimony whereof I affix my signature in presence of two witnesses.

HENRY C. SWAN.

Witnesses:
 JOHN H. BAEHR,
 EMIL W. JAITE.